(12) United States Patent
Wood et al.

(10) Patent No.: US 8,125,630 B2
(45) Date of Patent: Feb. 28, 2012

(54) AUTOMATIC TRACKING CAMERA

(75) Inventors: Stephen Robert Wood, Jacksonville, FL (US); Robert D. Umberhant, Jacksonville, FL (US)

(73) Assignee: GVBB Holdings S.A.R.L., Luxembourg (LU)

( * ) Notice: Subject to any disclaimer, the term of this patent is extended or adjusted under 35 U.S.C. 154(b) by 312 days.

(21) Appl. No.: 12/085,130

(22) PCT Filed: Dec. 5, 2005

(86) PCT No.: PCT/US2005/043853
§ 371 (c)(1), (2), (4) Date: May 16, 2008

(87) PCT Pub. No.: WO2007/067167
PCT Pub. Date: Jun. 14, 2007

(65) Prior Publication Data
US 2009/0121938 A1   May 14, 2009

(51) Int. Cl.
*G01B 11/26* (2006.01)
(52) U.S. Cl. .......... 356/139.09; 356/155; 356/150; 356/153
(58) Field of Classification Search .......... 356/139.09, 356/3.01–3.15, 4.01–4.1, 5.01–5.1, 6–22, 356/28, 28.5, 139.01
See application file for complete search history.

(56) References Cited

U.S. PATENT DOCUMENTS

| | | | |
|---|---|---|---|
| 3,678,283 A * | 7/1972 | LaBaw | 250/216 |
| 4,007,991 A * | 2/1977 | Robertsson | 356/141.3 |
| 5,389,967 A | 2/1995 | Kim | |
| 5,432,597 A | 7/1995 | Parker et al. | |
| 5,465,144 A | 11/1995 | Parker et al. | |
| 5,594,469 A | 1/1997 | Freeman et al. | |
| 5,668,629 A * | 9/1997 | Parker et al. | 356/139.05 |
| 5,748,321 A * | 5/1998 | Burks et al. | 356/635 |
| 5,844,599 A | 12/1998 | Hildin | |
| 6,002,808 A | 12/1999 | Freeman | |
| 6,043,805 A | 3/2000 | Hsieh | |
| 6,465,787 B1 | 10/2002 | Coulter et al. | |
| 6,559,935 B1 * | 5/2003 | Tew | 356/139.03 |
| 2007/0121096 A1 * | 5/2007 | Giger et al. | 356/5.02 |

FOREIGN PATENT DOCUMENTS

| | | |
|---|---|---|
| DE | 4230701 | 3/1993 |
| JP | 09096528 | 4/1997 |
| JP | 2004215210 | 7/2004 |
| WO | WO9119165 | 12/1991 |
| WO | WO0241128 | 5/2002 |
| WO | WO03030558 | 4/2003 |

OTHER PUBLICATIONS

Aitenbichler, E. et. al.: "An IR local positioning system for smart items and devices," Proceedings 23rd International Conference on Distributed Computing Systems Workshops, IEEE, May 19-22, 2003. pp. 334-339.
The International Search Report, dated Apr. 19, 2007.

* cited by examiner

*Primary Examiner* — Thomas Tarcza
*Assistant Examiner* — Luke Ratcliffe
(74) *Attorney, Agent, or Firm* — Arent Fox, LLP

(57) ABSTRACT

A tracking system includes an emitter array configured to emit radiation around a subject to be tracked in at least one dimension wherein each emitter or group of emitters is modulated to permit identification of a source of the radiation. A receiver is configured to receive the radiation from the emitter array, wherein one of the emitter array and the receiver are located on the subject to be tracked. A processor is configured to interpret changes in radiation and correlate the changes to a device position to output a device position control signal.

24 Claims, 4 Drawing Sheets

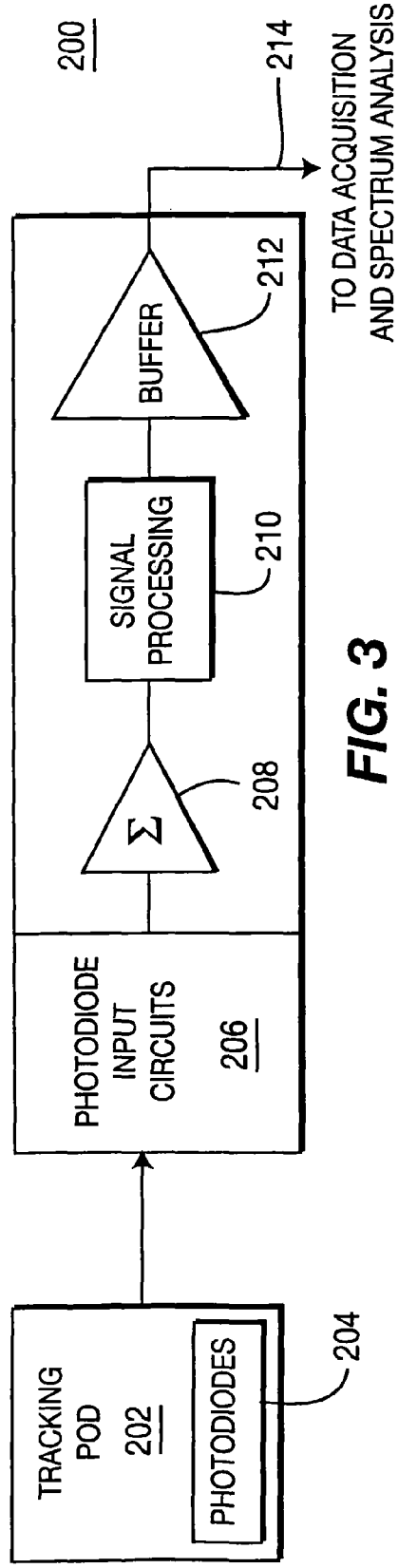
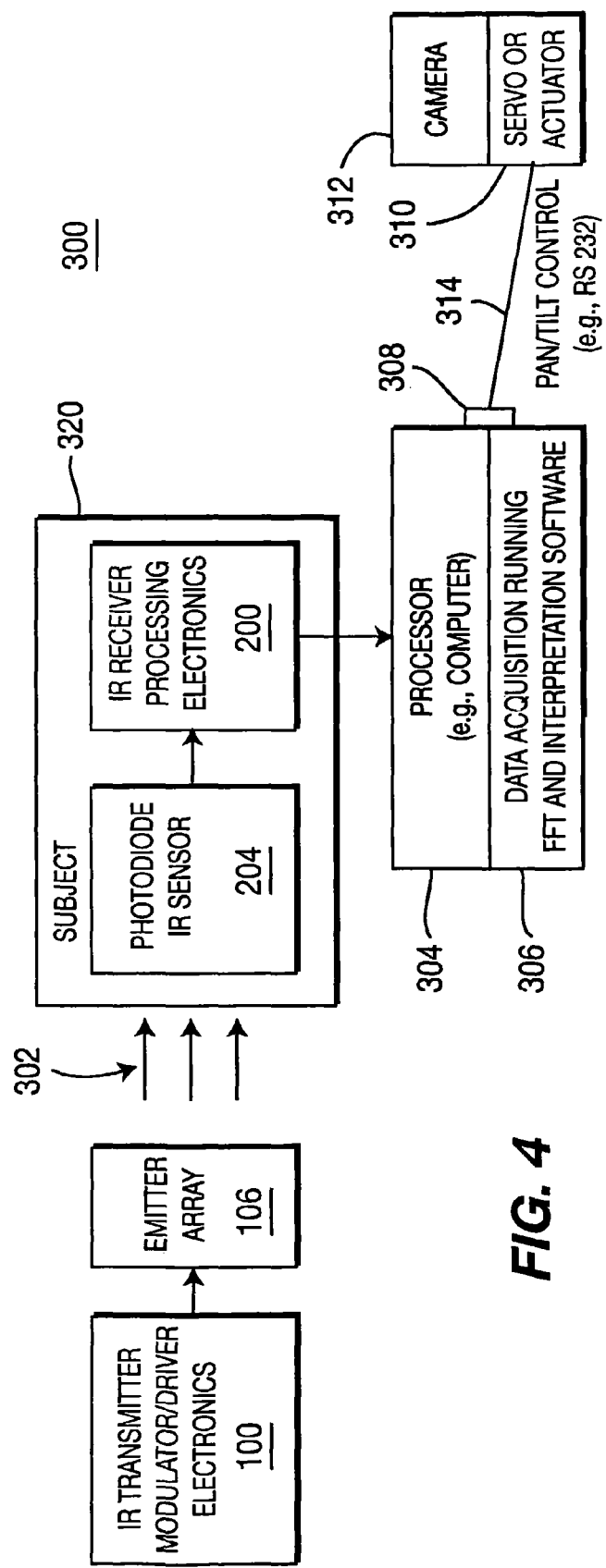
FIG. 3
FIG. 4

US 8,125,630 B2

AUTOMATIC TRACKING CAMERA

This application claims the benefit, under 35 U.S.C. §365 of International Application PCT/US2005/043853, filed Dec. 5, 2005, which was published in accordance with PCT Article 21(2) on Jun. 14, 2007, in English.

FIELD OF THE INVENTION

The present invention generally relates to systems and methods for developing and transmitting telemetry data and more particularly to a video camera unit and method which tracks a camera subject within a viewing frame of a video camera.

BACKGROUND OF THE INVENTION

Video cameras are employed for many applications including commercial and personal uses. Commercial applications may include making promotional videos, taping performances or lectures, etc. In a particularly useful commercial application, a speaker may record a lecture or provide an instructional video. In many cases these videos require personnel to record the event. Often the speaker may move about requiring the camera personnel to adjust the camera position or angle to maintain the speaker within the video frame.

While camera tracking equipment has been employed, such previous products have included motor driven moving parts that frequently wear out and fail. In many situations, it is not possible or inconvenient to provide a manned camera or "tracking" products to video tape a lecture or presentation. It would be beneficial to provide an automatic tracking system and method that would permit a speaker to move about freely and video tape a presentation without the assistance of camera personnel.

SUMMARY OF THE INVENTION

A tracking system includes an emitter array configured to emit radiation around a subject to be tracked in at least one dimension wherein the emitter array includes at least one individually modulated to permit identification of a source of the radiation. A receiver is configured to receive the radiation from the emitter array, wherein at least one emitter and the receiver are located on the subject to be tracked. A processor in the receiver is configured to measure relative radiation intensity from at least one emitter, interpret such data, correlate changes in the subject's position and output a device position control signal.

BRIEF DESCRIPTION OF THE DRAWINGS

The advantages, nature, and various additional features of the invention will appear more fully upon consideration of the illustrative embodiments now to be described in detail in connection with accompanying drawings wherein:

FIG. 3 is a block diagram showing an illustrative receiver unit for tracking a subject;

FIG. 4 is a block diagram showing an auto tracking system in accordance with a particularly useful embodiment;

Figure 1:
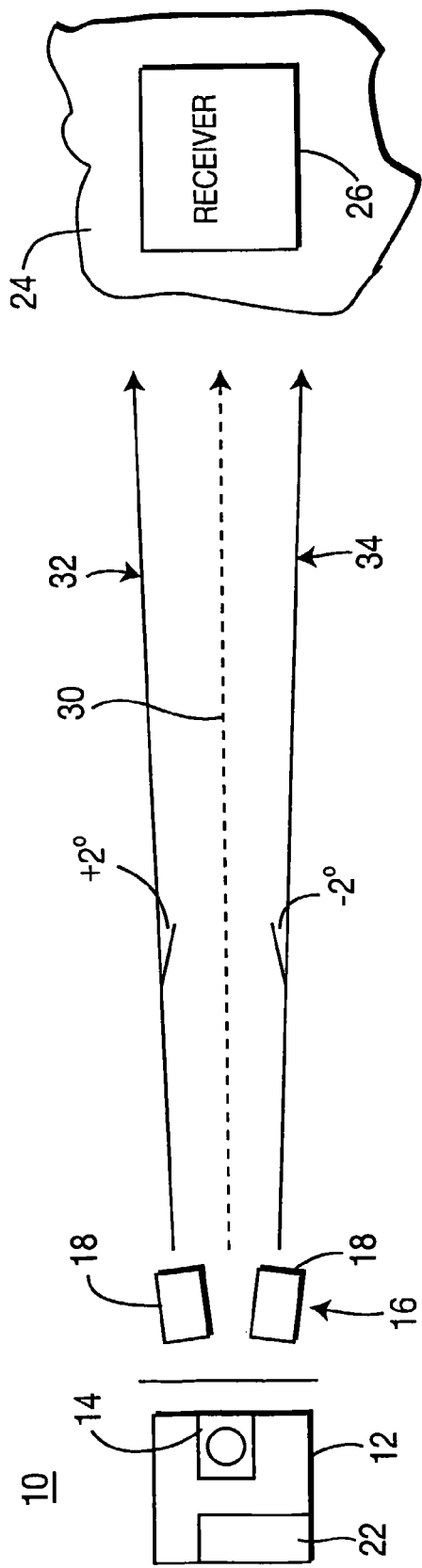
FIG. 1 is schematic diagram showing an emitter array having a pair of diodes transmitting light about a centerline to a subject to be tracked in an exemplary system.

It should be understood that the drawings are for purposes of illustrating the concepts of the invention and are not necessarily the only possible configuration for illustrating the invention.

DETAILED DESCRIPTION OF THE INVENTION

Aspects of the present invention provide systems and methods for developing and transmitting telemetry data, which depict operation angles of a video camera pan-tilt unit with respect to the camera subject. In particularly useful embodiments, an automatic tracking system is employed that keeps a moving subject, such as, e.g., a classroom instructor, within a viewing frame of a video camera.

In illustrative embodiments, a robotic or electronically controlled video understood that the number of emitters 18 may be much greater and may be employed in pairs, triples, quads, etc. and may be employed for a plurality of different axes and positions.

The array 16 is driven by electronic circuitry 22 that modulates the optical power of individual array elements 18 or array sections at different, strategically assigned frequencies. In the example shown in FIG. 1, an emitter A has optical power modulated at 30 kHz while emitter B has an optical power modulated at 32 kHz. In one embodiment, a subject 24 to be tracked by camera 14 wears a small optical receiver 26 which picks up infrared (IR) or other radiation beams 32, 34 and demodulates the signal to retrieve AC modulation signals. Appropriate filtering or waveform analysis is then applied to measure and compare amplitude of the recovered modulation signals. This comparison reveals the angular position of the camera relative to the subject and is used to reposition the pan/tilt unit 12 of the camera 14 to track the subject 24.

Several infrared beams are emitted from the location of the pan/tilt unit 12, toward the subject 24. An array of individual IR beam emitters 18 physically conforms to a precise geometric pattern that represents, e.g., X, Y and/or Z axes. The individual emitters 18 are set at precise angles relative to each other, which define a centerline 30 of propagation between beams 32 and 34. The individual beams also have a specified amount of divergence e.g., +2 degrees for beam 32 or −2 degrees for beam 34. In all, the array projects a radiation pattern that expands symmetrically with distance from the source (emitters 18).

The optical power produced by the IR emitter array 16 is modulated at several frequencies. Each frequency is used to drive a specific part of the array. For example, frequency A may represent −X while frequency B represents +X. In one example, frequencies A and B may be e.g., 30 kHz and 32 kHz, respectively.

The subject 24 to be tracked is equipped with an IR receiving device 26. Receiving devices 26 may include a small clip on device that can be easily worn on a shirt pocket or collar of the subject 24 or may hang from the neck of the subject. Other ways of attaching receiver 26 may also be employed. The position of the pan/tilt unit 12 relative to the subject is discerned by comparing the energy levels of the modulation frequencies.

Figure 2:
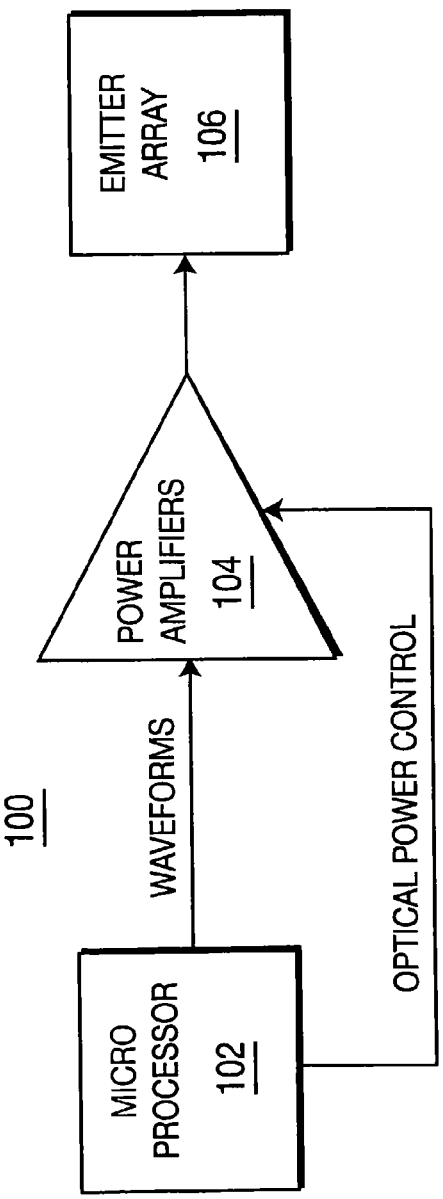
FIG. 2 is a block diagram showing an illustrative transmission unit for tracking a subject.

Referring to FIG. 2, a transmission unit 100 is illustratively shown for emitting radiation for automatically tracking a subject using telemetry. Unit 100 includes a microprocessor 102 capable of generating waveforms for modulating camera and pan-tilt unit automatically follows the movements of a subject, eliminating the requirement for camera operating personal. As a replacement for tracking systems of robotic cameras, the present system eliminates many problems, including frequent failure of moving mechanical or electro-mechanical parts. The system described herein eliminates such problems because the system includes few moving parts. It also greatly reduces system complexity and associated manufacturing cost while increasing product quality, durability and manufacturability. In addition, the present system may allow for multiple systems to be operated in relatively close proximity, which is not possible with other camera tracking systems.

It is to be understood that the present invention is described in terms of a video recording system; however, the present invention is much broader and may include any system, which is capable of tracking a subject. For example, an audio system where a microphone is directionally altered in accordance with apposition of a subject or a system where the subject is an object or a living subject other than a human. In addition, the present invention is applicable to any recording media including recording data taken or transmitted by telephone, set top boxes, computer, wireless, satellite links, etc.

It should be understood that the elements shown in the FIGS. may be implemented in various forms of hardware, software or combinations thereof. Preferably, these elements are implemented in a combination of hardware and software on one or more appropriately programmed general-purpose devices, which may include a processor, memory and input/output interfaces.

Referring now in specific detail to the drawings in which like reference numerals identify similar or identical elements throughout the several views, and initially to FIG. 1, an illustrative embodiment for an automatic camera tracking system 10 is shown. System 10 includes a motorized pan-tilt unit 12 for a video camera or other device 14. An array 16 of diodes 18 is mounted on or near the pan-tilt unit 12. In one embodiment, the diodes 18 include infrared emitting diodes (IREDs).

The array 16 is mounted on the electronically controlled pan-tilt unit 12, which may control positioning for a video camera, movie camera, microphone, camera or another suitable device. The individual emitters 18 in the array 16 each represent opposite directions on a given axis and are mounted at complementary angles to each other. An angular relationship between adjacent emitters associated with opposite directions of one axis is illustratively shown in FIG. 1. It is to be signals. Microprocessor 102 outputs the waveforms to power amplifiers 104 to amplify the waveforms so that the waveforms may be employed to modulate emitters in the emitter array 106. The emitters in array 106 transmit optically modulated signals. It should be noted that the microprocessor 102 generates different waveforms of different frequency or amplitude to be employed by different emitters or portions of the emitter array. Multiplexers or other devices (e.g., switches) may be employed such that microprocessor 102 generates different frequency or amplitude signals that can be distributed to modulate different portions of the array.

Microprocessors 102 may also be employed to regulate power to amplifier (or amplifiers) 104. This may be employed to increase the power levels of the emitted signals depending on, e.g., a distance to a subject or other criteria. Microprocessor 102 may also be employed for other functions as well. For example, in one embodiment, microprocessor may be employed to interpret and compare feedback signals from the subject and control a position of a pan unit or other motorized device. Also, in a preferred embodiment, the emitters include IR emitters.

Referring to FIG. 3, a receiver device 200, which is preferably worn by or attached to a subject to be tracked is shown. Receiver 200 includes a tracking pod 202, which preferably includes a plurality of photodiodes 204. Photodiodes 204 receive the emitted light from the emitter array 106 (FIG. 2) and input the received signals to input circuits 206. Input circuits 206 are responsive to at least one of the intensity, amplitude and frequency of the received radiation. The received signal(s) are summed by a summer 208 and may be processed by signal conditioning circuitry or signal processor 210, in preparation for data extraction and processing farther downstream, where based on the intensity, amplitude and/or frequency the summed signal is processed to determine a position of the subject. The position of the subject may be determined by using the received signal information in a Fourier transform or other signal processing algorithm to determine or measure a position of the subject.

Depending on the system, the signal processing of the receiving may be performed at a separate position or location. In one embodiment, the summed signal information may be transmitted back to the microprocessor 102 (FIG. 2) or other device at the camera location, sent to a computer or other processing device or further processed at the receiver 200. In one embodiment, the data is sent to a computer or processing device to be spectrum analyzed to determine a position of the subject and to generate position or tracking information to update the position/angle of the camera. In such a case, analog signal conditioning 210 and/or a buffer 212 may be useful in conditioning and buffering the incoming data to be sent to a data acquisition and spectral analysis program 214.

Referring to FIG. 4, a system 300 is shown for automatically tracking a subject 320 in accordance with principles of the present disclosure. Array driver 100 includes electronic circuitry for powering and modulating an emitter array 106. Radiation 302 is received by a photodiode array 204 or other photo sensors. Receiver 200 includes processing electronics to receive and condition signals as output by the photo diodes of IR sensor 204. The received signal information is sent to a personal computer or other processing device 304.

Computer 304 may include one or more software programs for analyzing the data sent from receiver 200. Computer 304 may include software and algorithms 306 to support data acquisition, fast Fourier transform (FFT), telemetry data interpretation and system command communications. The interpreted data may include determining a position of a subject based upon the energy level received by receiver 200 of a given frequency modulated optical signal. In this way, a telemetric representation of a position of the subject may be determined for each access to permit adjustment of a camera angle or position.

Computer 304 preferably includes a printed wiring board, card or a port 308, which outputs signals for controlling a servo(s) or other motion devices 310. These signals include pan/tilt control signals for moving a camera 312. The port 308 may use an RS-232 protocol although other protocols may be employed. The interpretation of the data may include determining a direction and magnitude of a position change for the camera in order to center the subject. Alternately, the subject need not be centered, but may be positioned in accordance with a predetermined position or coordinates.

Servos 310 respond to pan/tilt control signals 314 sent from computer 304 to appropriately move the camera 312 to a new position in accordance with the movements of the subject. It should be understood that the receiver 200 may communicate wirelessly with the computer 304. In this way, the subject is not limited in movement by wires. In addition, in an alternate embodiment, the transmitter 100 may be worn by the subject and the receiver 200 may be located near the camera 312.

Figure 5:
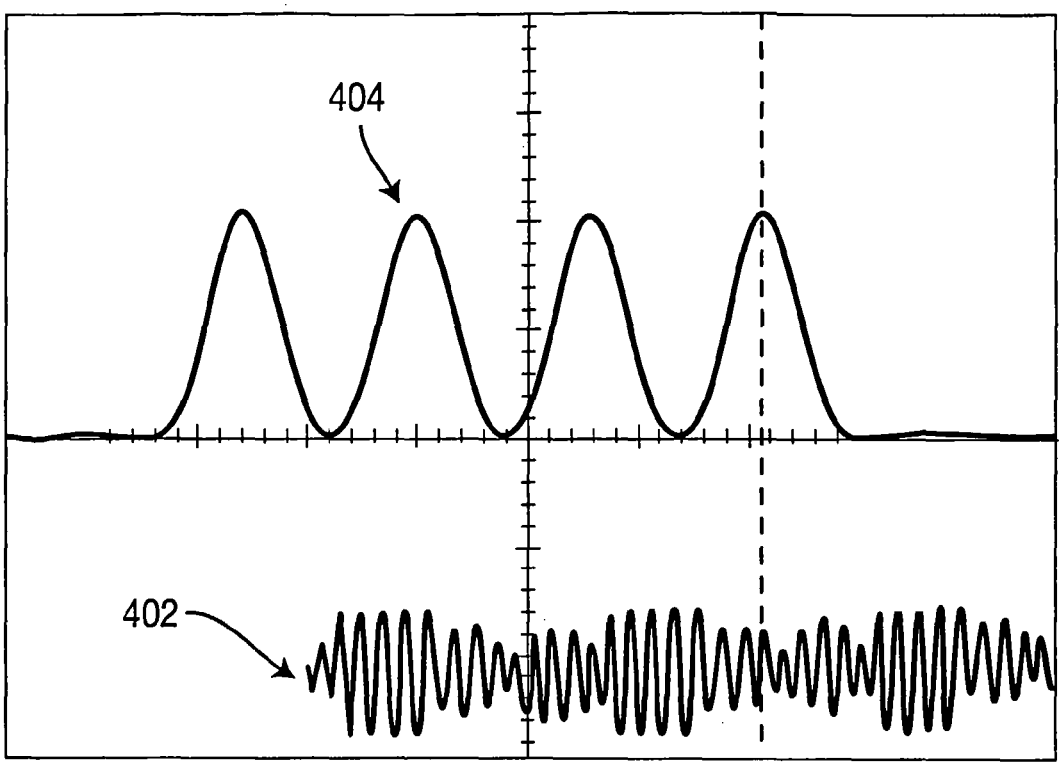
FIG. 5 shows traces depicting relative amplitudes for four modulation frequencies when a subject is centered in a camera view.
Figure 6:
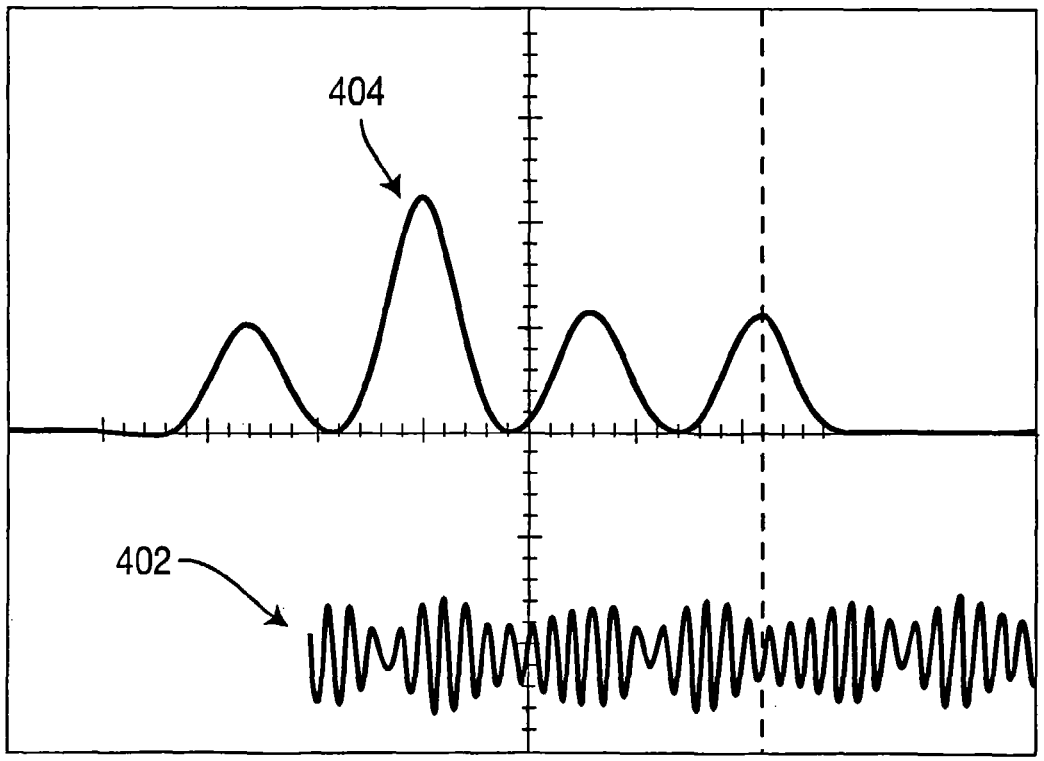
FIG. 6 shows traces depicting relative amplitudes for four modulation frequencies when a subject is off-center in the X direction.
Figure 7:
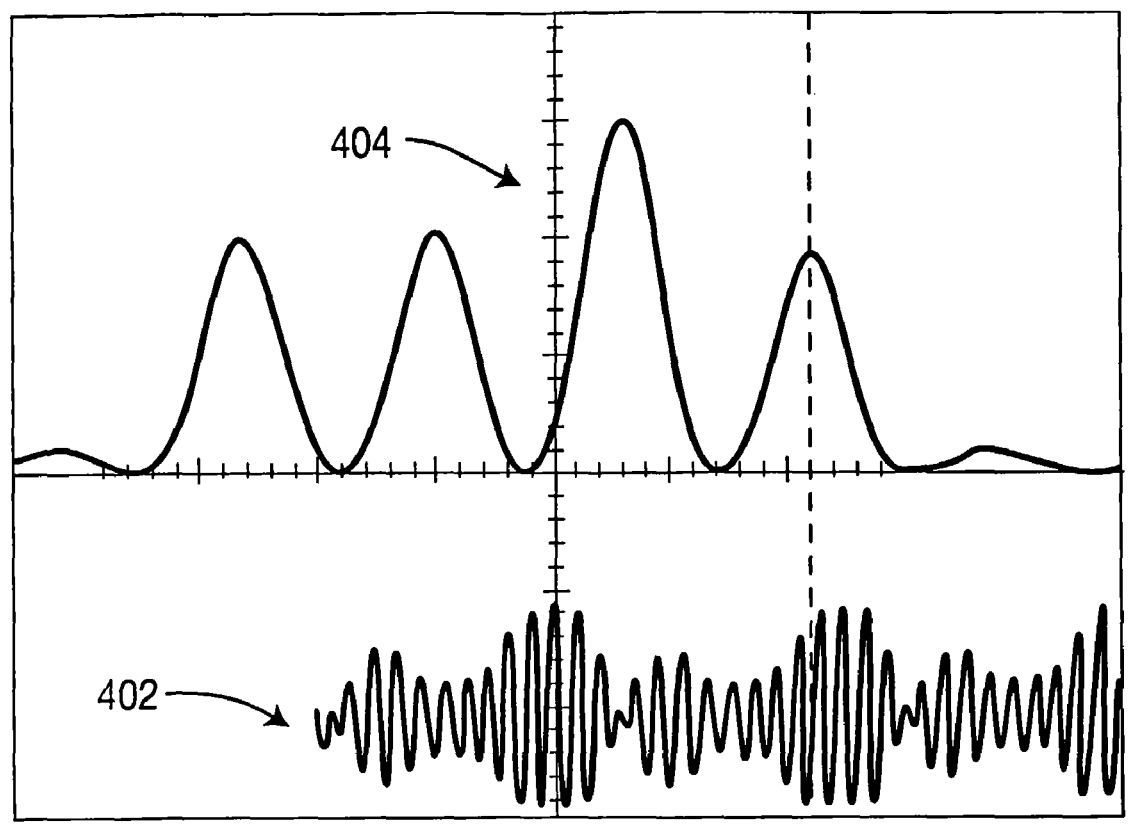
FIG. 7 shows traces depicting relative amplitudes for four modulation frequencies when a subject is off-center in the Y direction.

Referring to FIGS. 5-7, representations of oscilloscope displays showing relative energy levels of four modulation frequencies as seen by an IR receiver are illustratively show. A bottom trace 402 in each display shows a summed signal as received by receiver 200 (FIG. 4). A top trace 404 in each display shows the relative amplitudes for four modulation frequencies as output from a Fourier Transform. The two leftmost peaks represent opposite directions on the X axis while the rightmost two peaks represent opposite directions on the Y axis.

In FIG. 5, all modulation frequencies of the top trace are of equal amplitude. This condition is the default or "home" position. The subject is standing or positioned in the center of the camera eye. In FIG. 6, the subject is centered on the Y axis, but off center on the left of the X axis. The second peak from the left is higher than the other peaks; therefore an x-axis correction is needed. In FIG. 7, the subject is centered on the X axis, but off center on the Y axis. The second peak from the right is higher than the other peaks; therefore a y-axis correction is needed. Depending on the relative positions of the emitters a calculation of how much adjustment is needed for correction is performed and provided as a control signal to move the camera.

Having described preferred embodiments for system and method for an automatic tracking camera (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

The invention claimed is:

1. A tracking apparatus, comprising:
   a processor responsive to changes in radiation received at a tracked subject, the radiation emanating from at least one emitter associated with a tracking device, the processor determining tracking changes for changing the position of the tracking device based on an energy level of the received emitter radiation,
   wherein the at least one emitter includes emitters arranged about a centerline such that each emitter of a pair is directed at an equal and opposite angle from the centerline, and
   wherein the processor interfaces with a radiation receiver in proximity of the tracked subject, the radiation receiver including a plurality of photodiodes that receive radiation signals emanating from the at least one emitter and a summer that sums the received radiation signals for processing by the processor to determine changes in position of the tracked subject.

2. The tracking apparatus as recited in claim 1, wherein the emitter is modulated to permit identification of a source of radiation and the processor is responsive to changes in radiation from said modulation.

3. The tracking apparatus as recited in claim 1, wherein the emitter is an air array that includes a plurality of infrared diodes.

4. The tracking apparatus as recited in claim 1, wherein the processor receives the summed radiation signals from the summer and processes the summed radiation signals by providing a Fourier transform of the summed radiation signals to determine changes in position of the tracked subject.

5. The tracking apparatus as recited in claim 1, wherein the at least one emitter comprises diode pairs.

6. The tracking apparatus as recited in claim 1, wherein the emitter emits radiation to monitor X and Y directions relative to an initial tracking device position.

7. The tracking apparatus as recited in claim 1, wherein the processor includes data acquisition software, which measures energy levels for a plurality of modulated emitter signals to determine a direction and magnitude for the changes to the tracking device position, and wherein the processor determines tracking changes for the tracking device based on the measured energy levels of the modulated emitter signals.

8. The tracking apparatus as recited in claim 7, wherein the modulated emitter signals include a distinct modulation frequency for each emitter or group of emitters in the array.

9. The tracking apparatus as recited in claim 4, wherein the receiver is coupled to the subject to be tracked and wirelessly communicates with the processor.

10. The tracking apparatus as recited in claim 1, wherein the emitter is controlled and modulated by a microprocessor.

11. A camera view tracking apparatus, comprising:
    a video camera;
    an emitter array configured to emit radiation towards a subject to be tracked in at least one dimension wherein at least one of each emitter of at least one group of emitters is modulated to permit identification of a source of the radiation, wherein the emitter array includes emitters arranged about a centerline such that each emitter of a pair is directed at an equal and opposite angle from the centerline; and
    a receiver associated with a subject to be tracked and configured to receive the radiation emitted from the emitter array; and
    a processor configured to determine a position of the subject based on an energy level of the radiation received by the receiver from the emitter array, the processor configured to interpret changes in emitted radiation and determine changes to a camera position of the video camera based on the energy level of the received radiation,
    wherein the processor interfaces with the receiver in proximity of the subject, the receiver including a plurality of photodiodes that receive radiation signals emanating from the emitter array and a summer that sums the received radiation signals for processing by the processor to determine changes in position of the subject.

12. The tracking apparatus of claim 11, further comprising a pan/tilt unit configured to receive a camera position control signal from the processor and move the video camera in accordance therewith.

13. The tracking apparatus as recited in claim 11, wherein the emitter array includes a plurality of infrared diodes.

14. The tracking apparatus as recited in claim 11, wherein the processor receives the summed radiation signals from the summer and processes the summed radiation signals by providing a Fourier transform of the summed radiation signals to determine changes in position of the subject.

15. The tracking apparatus as recited in claim 11, wherein the emitter array comprises diode pairs.

16. The tracking apparatus as recited in claim 11, wherein the emitter array emits radiation to monitor X and Y directions relative to an initial camera position.

17. The tracking apparatus as recited in claim 11, wherein the processor includes data acquisition software, which measures energy levels for a plurality of modulated emitter signals to determine a direction and magnitude for the changes to the camera position of the video camera, and wherein the processor determines camera position changes for the video camera based on the measured energy levels of the modulated emitter signals.

18. The tracking apparatus as recited in claim 11, wherein the modulated emitter signals include a distinct modulation frequency for each emitter or group of emitters in the array.

19. The tracking apparatus as recited in claim 11, wherein the receiver wirelessly communicates with the processor.

20. The tracking apparatus as recited in claim 11, wherein the emitter array is controlled and modulated by a microprocessor.

21. A camera view tracking apparatus, comprising:
a video camera;
a transmitter including a microprocessor which controls and modulates an emitter array, the emitter array comprising at least one emitter arranged about a centerline such that emitter of a pair is directed at an equal and opposite angle from the centerline and said emitter array is configured to emit radiation about the centerline between the emitter array and an initial position of a subject to be tracked in at least one dimension wherein each emitter or group of emitters is modulated to permit identification of a source of the radiation;
a receiver connected to the subject to be tracked and configured to receive the radiation emitted from the emitter array and process received radiation signals;
a processor including data acquisition software, which measures energy levels for a plurality of modulated emitter signals to determine a direction and magnitude for changes to a camera position of the video camera, the processor configured to interpret changes in the received radiation signals and correlate the changes to the camera position to output a camera position control signal; and
a pan/tilt unit configured to receive the camera position control signal and move the video camera in accordance therewith,
wherein the microprocessor interfaces with the receiver in proximity of the subject, the receiver including a plurality of photodiodes that receive radiation signals emanating from the emitter array and a summer that sums the received radiation signals for processing by the processor to determine changes in position of the subject.

22. The tracking apparatus as recited in claim 21, wherein the emitter array comprises diode pairs.

23. A method comprising:
receiving radiation signals from a tracked subject, the radiation signals are emitted from an emitting source associated with a tracking device and received by the tracked subject via a receiver, wherein the emitting source includes at least one emitter arranged about a centerline such that each emitter of a pair is directed at an equal and opposite angle from the centerline; and
processing the received radiation signals to determine a position of the tracked subject based on an energy level of the received radiation signals to determine tracking changes for changing the position of the tracking device,
wherein the receiver includes a plurality of photodiodes for receiving the radiation signals emanating from the emitter source and a summer for summing the received radiation signals for processing to determine changes in position of the tracked subject.

24. The method of claim 23, further comprising:
measuring energy levels for a plurality of modulated emitter radiation signals that comprise the received radiation signals to determine a direction and magnitude for changes to the position of the tracking device,
wherein processing the received radiation signals includes determining tracking changes for the tracking device based on the measured energy levels of the modulated emitter radiation signals.

* * * * *